US012719614B2

(12) United States Patent
Zhou et al.

(10) Patent No.: US 12,719,614 B2
(45) Date of Patent: Aug. 25, 2026

(54) HYBRID AUTOMATIC REPEAT REQUEST FEEDBACK METHOD AND APPARATUS

(71) Applicant: HUAWEI TECHNOLOGIES CO., LTD., Shenzhen (CN)

(72) Inventors: Yue Zhou, Shenzhen (CN); Ying Chen, Hangzhou (CN); Rong Li, Boulogne Billancourt (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 319 days.

(21) Appl. No.: 18/398,474

(22) Filed: Dec. 28, 2023

(65) Prior Publication Data

US 2024/0129066 A1 Apr. 18, 2024

Related U.S. Application Data

(63) Continuation of application No. PCT/CN2022/095896, filed on May 30, 2022.

(30) Foreign Application Priority Data

Jun. 29, 2021 (CN) ......................... 202110727732.0

(51) Int. Cl.
*H04L 1/18* (2023.01)
*H04L 1/08* (2006.01)
(Continued)

(52) U.S. Cl.
CPC .............. *H04L 1/1812* (2013.01); *H04L 1/08* (2013.01); *H04L 5/0053* (2013.01)

(58) Field of Classification Search
CPC ........ H04L 1/1812; H04L 1/08; H04L 5/0053
See application file for complete search history.

(56) References Cited

U.S. PATENT DOCUMENTS

2010/0146355 A1* 6/2010 Jiang ..................... H04L 1/1845 714/E11.113
2019/0229856 A1 7/2019 Sano et al.
(Continued)

FOREIGN PATENT DOCUMENTS

EP 3827633 A1 6/2021
WO WO-2009075509 A2 * 6/2009 ........... H04L 1/1812
(Continued)

OTHER PUBLICATIONS

3rd Generation Partnership Project; Technical Specification Group Radio Access Network; Evolved Universal Terrestrial Radio Access (E-UTRA); Physical layer procedures (Release 16), 3GPP TS 36.213 V16.5.0 (Mar. 2021), total 577 pages.
(Continued)

*Primary Examiner* — Brenda H Pham
(74) *Attorney, Agent, or Firm* — Rimon PC

(57) ABSTRACT

A terminal device receives first indication information, where the first indication information indicates a first quantity of retransmissions of first data. The terminal device obtains a second quantity of retransmissions based on a hybrid automatic repeat request (HARQ) feedback result and/or a decoding result of second data, where the second data is data retransmitted by the terminal device before the terminal device retransmits the first data. The terminal device sends the first data by using a target quantity of retransmissions, where the target quantity of retransmissions is a smaller one of the first quantity of retransmissions and the second quantity of retransmissions. Because data transmission is performed using the determined target quantity of retransmissions, the delay caused by a HARQ feedback procedure can be reduced, resources can be saved, and power consumption can be lowered.

18 Claims, 7 Drawing Sheets

(51) Int. Cl.

| | |
|---|---|
| ***H04L 1/1812*** | (2023.01) |
| ***H04L 5/00*** | (2006.01) |

(56) References Cited

U.S. PATENT DOCUMENTS

| | | | | |
|---|---|---|---|---|
| 2020/0137827 | A1* | 4/2020 | Cariou .................. | H04W 80/02 |
| 2021/0028891 | A1* | 1/2021 | Zhou ....................... | H04W 4/40 |

FOREIGN PATENT DOCUMENTS

| | | | | | |
|---|---|---|---|---|---|
| WO | WO-2009158195 | A2 * | 12/2009 | ............. | H04L 1/188 |
| WO | WO-2014100898 | A1 * | 7/2014 | ............ | H04W 72/23 |
| WO | 2015113214 | A1 | 8/2015 | | |
| WO | WO-2021209977 | A1 * | 10/2021 | ........... | H04L 1/1887 |

OTHER PUBLICATIONS

Nokia, Nokia Shanghai Bell: "Discussion on HARQ stalling avoidance." 3GPP TSG RAN WG1 #102 e-Meeting, Aug. 17-29, 2020, R1-2006423, total 4 pages.

* cited by examiner

HYBRID AUTOMATIC REPEAT REQUEST FEEDBACK METHOD AND APPARATUS

CROSS-REFERENCE TO RELATED APPLICATIONS

This application is a continuation of International Patent Application No. PCT/CN2022/095896, filed on May 30, 2022, which claims priority to Chinese Patent Application No. 202110727732.0, filed on Jun. 29, 2021. The disclosures of the aforementioned applications are hereby incorporated by reference in their entireties.

TECHNICAL FIELD

This application relates to the communication field, and in particular, to a hybrid automatic repeat request feedback method and an apparatus.

BACKGROUND

A current terrestrial mobile communication network has limited coverage capabilities, and cannot meet people's requirements for obtaining information anytime and anywhere. For scenarios of establishing communication connections in remote areas, deserts, oceans, air, and the like, there are great challenges in terms of economy and feasibility in providing ultra-wide area coverage based on base station coverage modes. To overcome disadvantages of the terrestrial mobile communication network, satellite communication may be an effective supplement to a traditional terrestrial network.

In an existing terrestrial mobile communication network, for example, a narrowband internet of things (NB-IoT) network or a new radio (NR) network, a hybrid automatic repeat request (HARQ) process depends on a HARQ response. However, in satellite communication, a round-trip time (RTT) due to path propagation is much greater than that in terrestrial communication. When only a blind retransmission technology is used, the quantity of retransmissions cannot be accurately specified, a small quantity of repetitions cannot meet a reliability requirement, and a HARQ response may be required to initiate a retransmission, causing a new waiting delay. Excessive repetitions occupy extra network air interface resources, causing an increase in power consumption by user equipment (UE) and wasting limited battery energy.

Therefore, how to reduce delay caused by a HARQ process, thereby saving resources, and reducing power consumption is a problem to be urgently resolved.

SUMMARY

This application provides a hybrid automatic repeat request (HARQ) feedback method and a related apparatus, to reduce delay caused by a HARQ process, save resources, and reduce power consumption.

According to a first aspect, a hybrid automatic repeat request (HARQ) feedback method is provided. The method may include: a terminal device receives first indication information, where the first indication information indicates a first quantity of retransmissions of first data. The terminal device obtains a second quantity of retransmissions based on a HARQ feedback result and/or a decoding result of second data, where the second data is data sent or received by the terminal device before the terminal device retransmits the first data. The terminal device sends the first data by using a target quantity of retransmissions, where the target quantity of retransmissions is a smaller one of the first quantity of retransmissions and the second quantity of retransmissions.

The present application provides a method for determining a target quantity of retransmissions. This solves the problem that the quantity of retransmissions cannot be accurately specified when only a blind retransmission technology is used, effectively avoiding wasting resources when the quantity of blind retransmissions is excessively large, thereby reducing power consumption and meeting a reliability requirement of data transmission.

With reference to the first aspect, in some implementations of the first aspect, the terminal device may determine the second quantity of retransmissions based on a quantity of times that the second data is already repeatedly uploaded when an ACK is fed back.

In other words, the quantity of times that the second data is repeatedly uploaded when the ACK is fed back may meet a data transmission requirement. The determined second quantity of retransmissions may be less than the indicated quantity of blind retransmissions.

With reference to the first aspect, in some implementations of the first aspect, the terminal device determines the second quantity of retransmissions based on the quantity of retransmissions when the decoding result of the second data is complete.

It should be understood that, that the decoding result is complete may be that the decoding result of the data meets a reliability requirement, or may be that a decoding result of complete data can be identified. Generally, a decoding feedback ACK may be used as a determination criterion for successful decoding.

It should be understood that the second quantity of retransmissions may be a quantity of retransmissions when the decoding result of the second data is complete, or may be a quantity of blind retransmissions of the second data, or may be calculated based on a proportion of the quantity of retransmissions when the decoding result of the second data is complete to the indicated quantity of retransmissions of the second data.

It should be further understood that the second quantity of retransmissions may be determined separately based on the ACK or the decoding result, or may be determined with reference to the ACK and the decoding result.

With reference to the first aspect, in some implementations of the first aspect, the terminal device sends second indication information, where the second indication information indicates that a HARQ response is disabled for the first data.

In the method, a message indicating that the HARQ response is disabled for the first data is sent or forwarded to a network device, so that the network device does not need to perform a HARQ feedback, and the terminal device does not need to wait for a response. This avoids a large delay.

With reference to the first aspect, in some implementations of the first aspect, the terminal device sends the second indication information when transmitting the first data for the first time;

the terminal device sends the second indication information when transmitting the first data for the last time; or the terminal device sends the second indication information when transmitting the first data each time.

With reference to the first aspect, in some implementations of the first aspect, when the terminal device sends the second indication information during transmission of the first data for the first time, or when the terminal device sends the second indication information during transmission of the first data for the last time, a quantity of bits occupied by the second indication information may be determined based on the second quantity of retransmissions.

With reference to the first aspect, in some implementations of the first aspect, when the target quantity of retransmissions is the second quantity of retransmissions, the terminal device may send information about the second quantity of retransmissions.

With reference to the first aspect, in some implementations of the first aspect, the terminal device sends third indication information when a quantity of transmissions of the first data is greater than a preset threshold, where the third indication information indicates to stop a retransmission of the first data.

It should be understood that the preset threshold may be configured, or may be manually defined. This is not limited in this application.

In other words, the terminal device may notify the network device of the target quantity of retransmissions, or may indicate, during the last transmission of the target quantity of retransmissions, to stop a retransmission of the first data, so that the network device does not need to wait for receiving the data, and the terminal device does not need to wait for receiving a HARQ. This reduces delay and lowers power consumption.

With reference to the first aspect, in some implementations of the first aspect, the terminal device clears a HARQ buffer after completing sending of the data for the last time.

In the method, the terminal device clears the buffer in a timely manner, so that resource and power consumption can be reduced.

According to a second aspect, a hybrid automatic repeat request (HARQ) feedback method is provided. The method may include:

A network device sends first indication information, where the first indication information indicates a first quantity of retransmissions of first data.

The network device receives the first data by using a target quantity of retransmissions, where the target quantity of retransmissions is a smaller one of the first quantity of retransmissions and a second quantity of retransmissions. The second quantity of retransmissions is obtained by a terminal device based on a HARQ feedback result and/or a decoding result of second data, and the second data is data sent or received by the terminal device before the terminal device retransmits the first data.

With reference to the second aspect, in some implementations of the second aspect, the second quantity of retransmissions is determined based on a quantity of times that the second data is already repeatedly uploaded when an ACK is fed back.

With reference to the second aspect, in some implementations of the second aspect, the second quantity of retransmissions is determined by a quantity of actually combined data packets including the second data when the ACK is obtained through decoding of the second data.

With reference to the second aspect, in some implementations of the second aspect, the network device receives second indication information, where the second indication information indicates that a HARQ response is disabled for the first data.

With reference to the second aspect, in some implementations of the second aspect, that the network device receives second indication information includes:

The network device receives the second indication information for first data transmission for the first time;

the network device receives the second indication information for first data transmission for the last time; or the network device receives the second indication information for first data transmission each time.

With reference to the second aspect, in some implementations of the second aspect, the second indication information is located in the first data.

With reference to the second aspect, in some implementations of the second aspect, when the network device receives the second indication information for first data transmission for the first time, or when the network device receives the second indication information for first data transmission for the last time, a quantity of bits occupied by the second indication information is determined based on the second quantity of retransmissions.

With reference to the second aspect, in some implementations of the second aspect, when the target quantity of retransmissions is the second quantity of retransmissions, the network device receives information about the second quantity of retransmissions.

With reference to the second aspect, in some implementations of the second aspect, the network device receives third indication information when a quantity of times of receiving the first data is greater than a preset threshold, where the third indication information indicates to stop a retransmission of the first data.

According to a third aspect, a hybrid automatic repeat request (HARQ) feedback method is provided. The method may include:

A terminal device receives fourth indication information, where the fourth indication information indicates a service type of third data.

The terminal device determines, based on a first mapping relationship, a first HARQ process group corresponding to the third data, where the first mapping relationship includes a mapping relationship between the service type of the third data and the HARQ process group. The terminal device sends the third data through a first HARQ process, where the first HARQ process is one process in the first HARQ process group.

In the method, a service type, a HARQ process group, and a data processing manner are bound, and a HARQ feedback solution is determined based on the service type, so that delay and device power consumption can be reduced.

With reference to the third aspect, in some implementations of the third aspect, the first mapping relationship may include:

a first service type corresponds to a second HARQ process group, the first service type includes a service type whose target delay is less than a first threshold and target reliability is greater than a second threshold, and a blind retransmission is allowed and a HARQ response is disabled in each HARQ process included in the second HARQ process group;

a second service type corresponds to a third HARQ process group, the second service type includes a service type whose target delay is less than the first threshold and target reliability is less than the second threshold, and a blind retransmission and a HARQ response are disabled in each HARQ process included in the third HARQ process group;

a third service type corresponds to a fourth HARQ process group, the third service type includes a service type whose target delay is greater than the first threshold and a target reliability is greater than the second threshold, and a HARQ response and a blind retransmission are allowed in each HARQ process included in the fourth HARQ process group; and a fourth service type corresponds to a fifth HARQ process group, the fourth service type includes a service type whose target delay is greater than the first threshold and a target reliability is less than the second threshold, and a HARQ response is allowed and a blind retransmission is disabled in each HARQ process included in the fifth HARQ process group.

According to a fourth aspect, a hybrid automatic repeat request (HARQ) feedback method is provided. The method may include:

A network device sends fourth indication information, where the fourth indication information indicates a service type of third data.

The network device receives the third data through a first HARQ process.

The network device determines, based on the first HARQ process and a first mapping relationship, whether to send a HARQ response, where the first mapping relationship includes a mapping relationship between the service type of the third data and a first HARQ process group.

With reference to the fourth aspect, in some implementations of the fourth aspect, the first mapping relationship may include:

a first service type corresponds to a second HARQ process group, the first service type includes a service type whose target delay is less than a first threshold and a target reliability is greater than a second threshold, and a blind retransmission is allowed and a HARQ response is disabled in each HARQ process included in the second HARQ process group;

a second service type corresponds to a third HARQ process group, the second service type includes a service type whose target delay is less than the first threshold and a target reliability is less than the second threshold, and a blind retransmission and a HARQ response are disabled in each HARQ process included in the third HARQ process group;

a third service type corresponds to a fourth HARQ process group, the third service type includes a service type whose target delay is greater than the first threshold and a target reliability is greater than the second threshold, and a HARQ response and a blind retransmission are allowed in each HARQ process included in the fourth HARQ process group; and a fourth service type corresponds to a fifth HARQ process group, the fourth service type includes a service type whose target delay is greater than the first threshold and a target reliability is less than the second threshold, and a HARQ response is allowed and a blind retransmission is disabled in each HARQ process included in the fifth HARQ process group.

It should be understood that the network device may indicate the service type to a terminal device, and the terminal device may determine the HARQ process based on the service type and the preset mapping relationship. The mapping relationship may be agreed upon between the network device and the terminal device, or may be preconfigured.

In a possible implementation, the network device may indicate the service type and the applicable process group of the third data to the terminal device, or may indicate the service type, the process group, a quantity of blind retransmissions, and whether the HARQ response is disabled to the terminal device.

In a possible implementation, the network device and the terminal device protocol-preconfigure a mapping relationship, so that the network device indicates the process group to the terminal device, and the terminal device determines a subsequent procedure based on the process group and the mapping relationship.

According to a fifth aspect, a wireless communication apparatus is provided. The wireless communication apparatus includes the modules or units configured to perform the method according to any one of the first aspect or the possible implementations of the first aspect.

According to a sixth aspect, a wireless communication apparatus is provided. The wireless communication apparatus includes the modules or units configured to perform the method according to any one of the second aspect or the possible implementations of the second aspect.

According to a seventh aspect, a wireless communication apparatus is provided. The wireless communication apparatus includes the modules or units configured to perform the method according to any one of the third aspect or the possible implementations of the third aspect.

According to an eighth aspect, a wireless communication apparatus is provided. The wireless communication apparatus includes the modules or units configured to perform the method according to any one of the fourth aspect or the possible implementations of the fourth aspect.

According to a ninth aspect, a communication device is provided. The communication device includes a processor. The processor is coupled to a memory, and may be configured to perform the method according to the first aspect and the possible implementations of the first aspect, or the third aspect and the possible implementations of the third aspect. Optionally, the communication device further includes the memory. Optionally, the communication device further includes a communication interface, and the processor is coupled to the communication interface.

In an implementation, the communication device is a satellite. When the communication device is the satellite, the communication interface may be a transceiver or an input/output interface.

In another implementation, the communication device is a chip or a chip system. When the communication device is the chip or the chip system, the communication interface may be an input/output interface, an interface circuit, an output circuit, an input circuit, a pin, a related circuit, or the like on the chip or the chip system. The processor may alternatively be embodied as a processing circuit or a logic circuit.

According to a tenth aspect, a communication device is provided. The communication device includes a processor. The processor is coupled to a memory, and may be configured to execute instructions in the memory, to implement the method according to the second aspect and the possible implementations of the second aspect, or the fourth aspect and the possible implementations of the fourth aspect. Optionally, the communication device further includes the memory. Optionally, the communication device further includes a communication interface, and the processor is coupled to the communication interface. Optionally, the transceiver may be a transceiver circuit. Optionally, the input/output interface may be an input/output circuit.

In an implementation, the communication device is a terminal device. When the communication device is the terminal device, the communication interface may be a transceiver or an input/output interface. Optionally, the transceiver may be a transceiver circuit. Optionally, the input/output interface may be an input/output circuit.

In another implementation, the communication device is a chip or a chip system. When the communication device is the chip or the chip system, the communication interface may be an input/output interface, an interface circuit, an output circuit, an input circuit, a pin, a related circuit, or the like on the chip or the chip system. The processor may alternatively be embodied as a processing circuit or a logic circuit.

According to an eleventh aspect, a communication apparatus is provided. The communication apparatus includes an input circuit, an output circuit, and a processing circuit. The processing circuit is configured to receive a signal through the input circuit, and transmit a signal through the output circuit, so that the method according to any one of the first aspect, the second aspect, the third aspect, or the fourth aspect, and the possible implementations of the foregoing aspects is implemented.

In a specific implementation process, the communication apparatus may be a chip. The input circuit may be an input pin. The output circuit may be an output pin. The processing circuit may be a transistor, a gate circuit, a trigger, any logic circuit, or the like. An input signal received by the input circuit may be received and input by, for example, but not limited to, a receiver. A signal output by the output circuit may be output to, for example, but not limited to, a transmitter and transmitted by the transmitter. In addition, the input circuit and the output circuit may be different circuits, or may be a same circuit. In this case, the circuit is used as the input circuit and the output circuit at different moments. Specific implementations of the processor and the various circuits are not limited in embodiments of this application.

According to a twelfth aspect, a processing apparatus is provided. The processing apparatus includes a processor and a memory. The processor is configured to: read instructions stored in the memory, receive a signal through a receiver, and transmit a signal through a transmitter, to perform the method according to any one of the first aspect, the second aspect, the third aspect, or the fourth aspect, and the possible implementations of the foregoing aspects.

Optionally, there are one or more processors, and there are one or more memories in the processing apparatus of the twelfth aspect.

Optionally, the memory may be integrated with the processor, or the memory and the processor are separately disposed.

In a specific implementation process, the memory may be, for example, a read-only memory (ROM). The memory and the processor may be integrated on a same chip, or may be separately disposed on different chips. A type of the memory and a manner in which the memory and the processor are disposed are not limited in embodiments of this application.

It should be understood that, a related data exchange process such as sending indication information may be a process of outputting the indication information from the processor, and receiving capability information may be a process of receiving the input capability information by the processor. Data output by the processor may be output to the transmitter, and input data received by the processor may be from the receiver. The transmitter and the receiver may be collectively referred to as a transceiver.

The processor in the twelfth aspect may be a chip. The processor may be implemented by hardware or software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may be located outside the processor and exist independently.

According to a thirteenth aspect, a processing apparatus is provided. The processing apparatus includes a communication interface and a processing circuit. The communication interface is configured to obtain to-be-processed data. The processing circuit is configured to process the to-be-processed data in the method according to any one of the first aspect or the third aspect, and the possible implementations of the first aspect or the third aspect.

According to a fourteenth aspect, a processing apparatus is provided. The processing apparatus includes a communication interface and a processing circuit. The communication interface is configured to send indication information in the method according to any one of the second aspect or the fourth aspect, and the possible implementations of the second aspect or the fourth aspect. The processing circuit is configured to generate the indication information.

It should be understood that explanations and beneficial effects in the first aspect and the third aspect are also applicable to the second aspect, the fourth aspect, and the corresponding apparatus. Details are not described herein again.

According to a fifteenth aspect, a computer program product is provided. The computer program product includes a computer program (which may also be referred to as code or instructions). When the computer program is executed on a computer, the computer is enabled to perform the method according to any one of the first aspect, the second aspect, the third aspect, or the fourth aspect, and the possible implementations of the foregoing aspects.

According to a sixteenth aspect, a computer-readable medium is provided. The computer-readable medium may be non-transitory and stores a computer program (which may also be referred to as code or instructions). When the computer program is run on a computer, the computer is enabled to perform the method according to any one of the first aspect, the second aspect, the third aspect, or the fourth aspect, and the possible implementation of the foregoing aspects.

According to a seventeenth aspect, a communication system is provided. The communication system includes the foregoing satellite and the foregoing terminal device.

DESCRIPTION OF EMBODIMENTS

The following describes technical solutions of this application with reference to accompanying drawings.

The technical solutions in embodiments of this application may be applied to various communication systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) system, a new radio (NR) system, a device-to-device (D2D) communication system, a machine-type communication system, an internet of vehicles communication system, a satellite communication system, or a future communication system.

Figure 1:
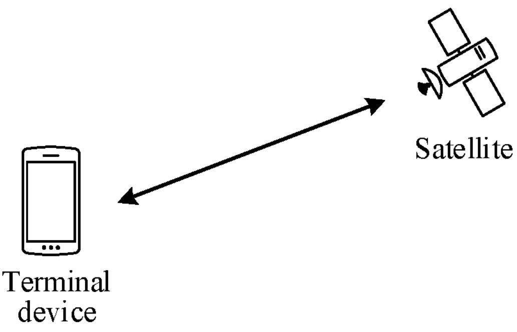
FIG. 1 is a schematic diagram of an example of a communication system to which a satellite communication method according to this application is applicable.

FIG. 1 is a schematic diagram of an architecture of a communication system to which an embodiment of this application is applicable. As shown in FIG. 1, the communication system may include at least one network device, for example, a network device shown in FIG. 1. The communication system may further include at least one terminal device, for example, a terminal device shown in FIG. 1. The network device may communicate with the terminal device through a wireless link.

It should be understood that the network device in embodiments of this application may be a device configured to communicate with the terminal device. The network device may be a base transceiver station (BTS) in a GSM system or a CDMA system, or may be a NodeB (NB) in a WCDMA system, or may be an evolved NodeB (eNB or eNodeB) in an LTE system, or may be a base station controller (BSC), a BTS, or the like, or may be one or a group (including a plurality of antenna panels) of antenna panels or the like of a base station in a 5G system, or may be a radio controller in a cloud radio access network (CRAN) scenario. Alternatively, the network device may be a relay station, an access point, a vehicle-mounted device, a wearable device, a terminal that bears a base station function in D2D communication or machine-type communication, a network device in a 5G network, a network device in a future evolved public land mobile network (PLMN) network, or the like. This is not limited in embodiments of this application.

It should be understood that the terminal device and UE may also be referred to as an access terminal device, a subscriber unit, a subscriber station, a mobile station, a mobile console, a remote station, a remote terminal device, a mobile device, a user terminal device, a terminal device, a wireless communication device, a user agent, or a user apparatus. The terminal device in embodiments of this application may be a mobile phone, a smart watch, a tablet computer (pad), a computer having a wireless transceiver function, a virtual reality (VR) terminal device, an augmented reality (AR) terminal device, a wireless terminal device in industrial control, a wireless terminal device in self driving, a wireless terminal device in remote medical, a wireless terminal device in a smart grid, a wireless terminal device in transportation safety, a wireless terminal device in a smart city, a wireless terminal device in a smart home, and the like. Alternatively, the terminal device may be a satellite phone, a cellular phone, a cordless phone, a session initiation protocol (SIP) phone, a wireless local loop (WLL) station, a personal digital assistant (PDA), or a handheld device having a wireless communication function. An application scenario is not limited in embodiments of this application.

Figure 2:
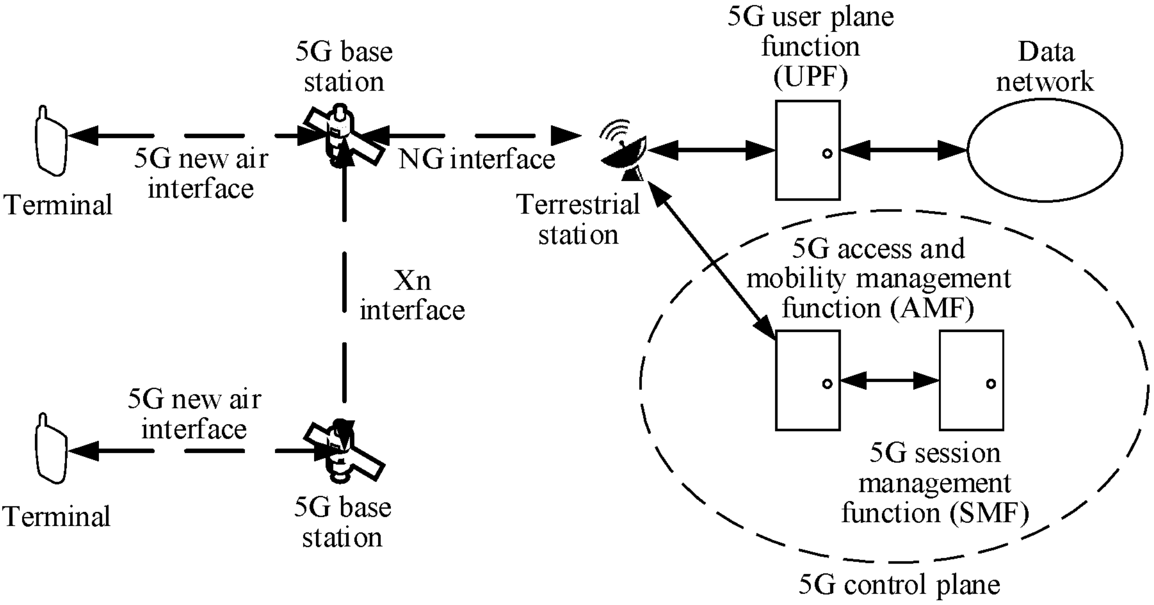
FIG. 2 is a schematic diagram of another example of a communication system to which a satellite communication method according to this application is applicable.

The solutions provided in this application may be applied to a satellite communication scope. For example, 3GPP members converge satellite communication and a 5G technology. FIG. 2 shows a network application architecture of the technology. A terrestrial mobile terminal device accesses a network through a 5G new air interface. A 5G base station is deployed on a satellite and is connected to a terrestrial core network through a radio link. In addition, there are radio links between satellites to implement signaling exchange and user data transmission between base stations. Network elements in FIG. 2 and interfaces of the network elements are described as follows:

Terminal device: a mobile device that supports the 5G new air interface, for example, a mobile phone and a pad typically. The terminal device may access a satellite network through an air interface, initiate a call, access the internet, and the like.

5G base station: mainly provides a wireless access service, schedules a wireless resource for an access terminal, and provides a reliable wireless transmission protocol and a reliable data encryption protocol.

5G core network: provides services of user access control, mobility management, session management, user security authentication, accounting, and the like. The 5G core network includes a plurality of functional units, and can be divided into a control-plane functional entity and a data-plane functional entity. An access and mobility management function (AMF) unit is responsible for user access management, security authentication, and mobility management. A user plane function (UPF) unit is responsible for managing functions of user plane data transmission, traffic statistics, and the like.

Terrestrial station: responsible for forwarding signaling and service data between a satellite base station and a 5G core network.

5G new air interface: a radio link between a terminal and a base station.

Xn interface: an interface between 5G base stations, and is used for signaling exchange such as handover.

NG interface: an interface between a 5G base station and a 5G core network, and is mainly used for exchange of NAS signaling and the like of the core network and user service data.

For ease of understanding this application, related technical concepts are briefly explained in advance:

1. A hybrid automatic repeat request process identifier (HARQ process identifier) is also referred to as a HARQ process ID, and uniquely specifies a HARQ process.
2. A new data indicator (NDI) indicates whether scheduled data is newly transmitted or retransmitted.

Each HARQ process stores one NDI value, and the value uses one bit to indicate whether scheduled data is newly transmitted or retransmitted. If an NDI value of a same HARQ process is changed compared with before (the NDI toggled), it indicates that a current transmission is an initial transmission of a new transport block (TB). Otherwise, (the NDI not toggled) indicates that the current transmission is a retransmission of the same TB.

3. A redundancy version (RV) indicates a redundancy version used for transmission. As an example, a value range of the RV is 0 to 3.

4. Modulation and coding scheme (MCS)

Downlink control information (DCI) uses 5-bit MCS indexes (0 to 31) to indicate a modulation and coding scheme used for the current transmission, and affects selection of a transport block size (TBS). There are 32 combinations for the MCS in total. Three combinations (whose indexes are 29 to 31) are reserved, and the three combinations are used only for retransmission.

5. Synchronous/Asynchronous

HARQ protocols are classified into a synchronous type of HARQ protocols and an asynchronous type of HARQ protocols in time domain, and are classified into an adaptive type of HARQ protocols and a non-adaptive type of HARQ protocols in frequency domain. An asynchronous HARQ means that a retransmission may occur at any moment, and also means that a HARQ process may be used in any order. A synchronous HARQ means that a retransmission can be performed only at a fixed moment after a previous transmission, and also means that only a specific HARQ process can be used for a specific subframe. An advantage of the synchronous HARQ is that the HARQ process number can be directly derived from a system frame number/subframe number, and the HARQ process number does not need to be explicitly sent. An advantage of the asynchronous HARQ is that retransmission scheduling is more flexible.

6. Adaptive/Non-adaptive

An adaptive HARQ means that a physical resource block (PRB) resource and an MCS used for a retransmission can be changed. A non-adaptive HARQ means that a retransmission needs to use a same PRB resource and a same MCS as those used for a previous transmission (a new transmission or a previous retransmission).

The HARQ is a technology that combines a forward error correction (FEC) method and an automatic repeat request (ARQ) method.

Through FEC, redundant information is added, so that a receive end can correct some errors, to reduce a quantity of retransmissions. For an error that cannot be corrected through FEC, the receive end requests, by using an ARQ mechanism, a transmit end to retransmit data. The receive end uses an error detection code, usually a cyclic redundancy check (CRC) code, to detect whether a received data packet is incorrect. If no error occurs, the receive end sends a positive acknowledgement (ACK) to the transmit end. After receiving the ACK, the transmit end continues to send a next data packet. If an error occurs, the receive end discards the data packet, and sends a negative acknowledgement (NACK) to the transmit end. After receiving the NACK, the transmit end retransmits same data.

An ARQ mechanism at a MAC layer uses the approach of discarding a data packet and requesting a retransmission. Although these data packets cannot be correctly decoded, useful information is still included in the data packets. If the data packets are discarded, the useful information is lost. When a HARQ with soft combining is used, received error data packets are stored in a HARQ buffer and combined with subsequently received retransmitted data packets to obtain a data packet that is more reliable than that of separate decoding (a "soft combining" process). Then, the combined data packet is decoded. If decoding still fails, a process of "requesting a retransmission, and then performing soft combination" is repeated.

The HARQ with soft combining is classified into two types: chase combining and incremental redundancy (IR) based on whether retransmitted bit information is the same as that in an original transmission. The bit information retransmitted in the chase combining is the same as that in the original transmission. The bit information retransmitted in the incremental redundancy does not need to be the same as that in the original transmission. Only an incremental redundancy mechanism is used in LTE and NR. In LTE, the asynchronous HARQ and the adaptive HARQ are used in a downlink, and the synchronous HARQ is used in an uplink. However, the retransmission may be adaptive or non-adaptive. In NR, the asynchronous HARQ is used in both the uplink and the downlink. A downlink asynchronous HARQ operation is performed through an uplink ACK/NACK signaling transmission, a new data indicator, a downlink resource allocation signaling transmission, and a retransmission of downlink data. A channel coding redundancy version RV of each retransmission is predefined and does not require additional signaling support. Because a channel coding rate for a downlink HARQ retransmission is already determined, MCS selection is not complete, but a modulation mode may still be selected. A change of the modulation mode causes adjustment of a quantity of RBs. Therefore, downlink signaling resource allocation signaling needs to be sent to a terminal device. In addition, a 1-bit NDI needs to be used to indicate whether this transmission is the first transmission of new data or a retransmission of old data.

It should be understood that the two communication parties in embodiments of this application may be network devices, for example, inter-satellite communication, may be terminal devices, or may be a network device and a terminal device. This is not limited in this application.

The following describes a solution by using an example in which the network device and the terminal device are used as two communication parties.

In an NB-IoT HARQ response mechanism, if a narrowband physical uplink shared channel (NPUSCH) transmission ends in an NB-IoT downlink subframe n−4, the terminal device attempts to receive a corresponding ACK/NACK (monitoring an NPDCCH) starting from an NB-IoT downlink subframe n. That is, an interval between a start time of the ACK/NACK for the NPUSCH transmission and an end time of the NPUSCH transmission related to the ACK/NACK is greater than or equal to 3 ms.

For an uplink HARQ, there is no downlink physical channel similar to a physical HARQ indicator channel (PHICH) for transmitting the ACK/NACK. To be specific, an eNodeB does not transmit actual ACK/NACK information. The terminal device determines whether to release content in the uplink HARQ buffer and whether to perform a retransmission or a new transmission based on whether an NDI field in a DCI format NO is reversed. In other words, the terminal device cannot release a HARQ buffer after sending uplink data. The terminal device can determine whether to clear the content in the HARQ buffer only after a next DCI format NO arrives. If a narrowband physical downlink shared channel (NPDSCH) transmission received by the terminal device ends in the NB-IoT downlink subframe n, the terminal device sends the corresponding ACK/NACK in N consecutive NB-IoT uplink slots by using a narrowband physical uplink shared channel (NPUSCH) format 2 after the transmission ends in a downlink subframe n+k0−1. After sending the uplink data, an NB-IoT device can clear the buffer only after waiting for a HARQ response. As a result, the IoT device has insufficient buffer space for storing data for a long time.

In the NR system, a HARQ time sequence for a specific HARQ process is basically the same as that in LTE. However, there is no explicit HARQ ACK/NACK (no PHICH) for the physical uplink shared channel (PUSCH) in the uplink. The terminal device determines whether the PUSCH is successfully decoded by detecting whether a gNB sends a backhaul request (indicated by an NDI in DCI 0_1/0_1). A downlink HARQ feedback time (indicated by K1) may be configured using DCI and RRC. A system whose TDD frame structure is DDDDU (where D represents a downlink slot, and U represents an uplink slot) and whose period is 2.5 ms is used as an example. HARQ feedback of all PDSCHs may be determined in a same uplink slot. A maximum value of K1 in a current version may be 15. A procedure for determining NR HARQ feedback timing is as follows: if the terminal device detects that a physical downlink shared channel (PDSCH) is received in a slot n or the terminal device detects that DCI is released by semi-persistent scheduling (SPS) in the slot n, the UE sends corresponding HARQ-ACK information in a slot (n+k1). k1 is indicated by using a PDSCH-to-HARQ timing indicator in the DCI. If the DCI does not have the timing indicator, k1 is indicated by using a higher-layer parameter DI-DataToUL-ACK. For an NR standard, a corresponding response needs to be waited for in both the uplink and the downlink, and the buffer cannot be cleared before the ACK.

To avoid a delay caused by a HARQ retransmission that needs to be enabled for a NACK, currently, for an NTN scenario, X blind retransmissions are proposed to be used for improving reliability of information transmission. However, if the value of X is small, some waiting time is still wasted in one HARQ RTT, a high NACK probability is caused, unnecessary backhaul is introduced, a throughput is reduced, and a delay is increased; or if the value of X is large, an air interface resource that can be used to transmit other information is occupied, and unnecessary power consumption of the IoT NTN is is caused. The quantity X indicated by a network side is limited by the speed of sensing the change in a channel quality by the network side (limited by reporting of a channel quality indication (CQI) by a terminal device side), and an accurate estimate of the quantity X of blind retransmissions cannot be provided.

Figure 3:
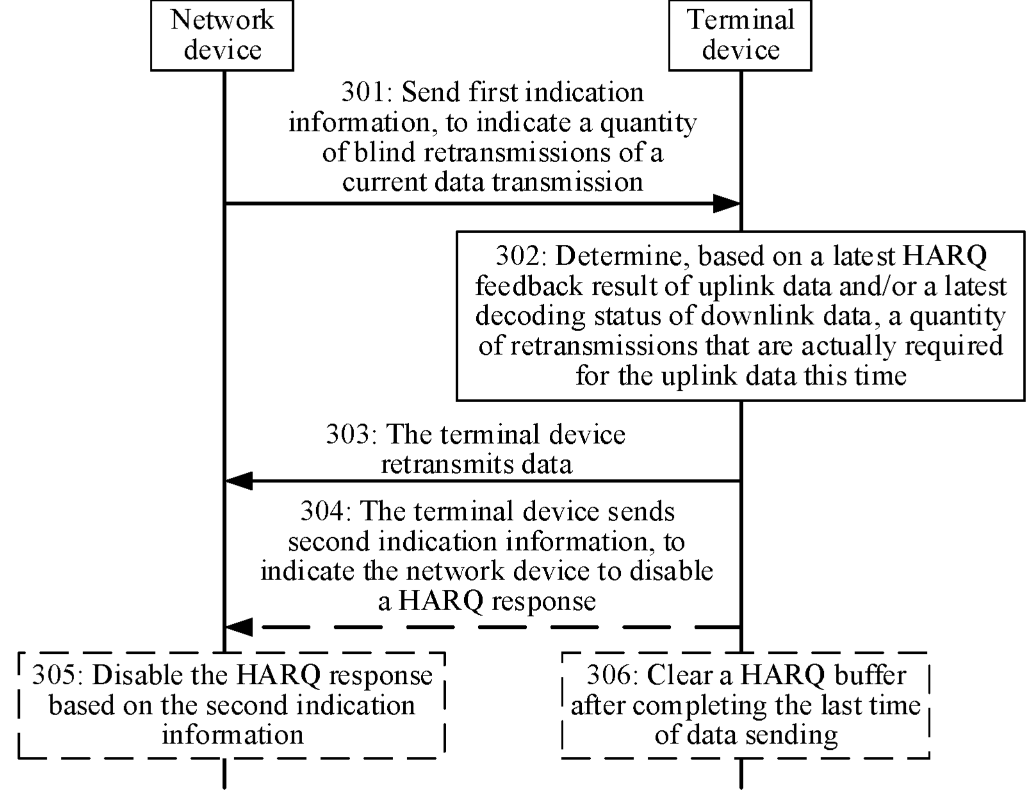
FIG. 3 is a schematic flowchart of a communication method to which this application is applicable.

In the existing NB-IoT and NR standards, a HARQ process depends on a HARQ response. In an NTT system, a problem of a large response waiting delay exists, and a large amount of time is consumed by transmitting a NACK. When waiting for a response, data in a HARQ buffer cannot be cleared, causing a waste of buffer resources. When only a blind retransmission technology is used, a quantity of retransmissions cannot be accurately specified, a small quantity of repetitions cannot meet a reliability requirement, and a HARQ response may be required to initiate a retransmission, causing a new waiting delay. Excessive repetitions occupy network air interface resources, causing an increase in power consumption of a terminal device and wasting limited battery energy. To resolve the foregoing problems, this application provides a HARQ feedback solution, as shown in FIG. 3.

301: A network device sends first indication information, to indicate a quantity of uplink blind retransmissions to a terminal device.

302: The terminal device determines, based on a latest HARQ feedback result of uplink data and/or a latest decoding status of downlink data, a quantity of retransmissions that are actually required for the uplink data this time.

303: The terminal device retransmits data.

Optionally, the solution may further include the following steps.

304: The terminal device sends second indication information, to indicate the network device to disable a HARQ response.

305: The network device receives the second indication information, and disables the HARQ response.

306: The terminal device clears a HARQ buffer after completing the last time of data sending.

In the method, a terminal device determines, through sensing or measurement, that a current quantity of retransmissions may meet an information transmission reliability requirement, and notifies a network side that a HARQ response does not need to be performed on a current data packet. After completing the last sending, the terminal device may clear the HARQ buffer. This reduces a delay caused by the terminal device waiting for a response before clearing the HARQ buffer after completing sending the data in the conventional technology. In addition, the terminal device notifies the network device of the quantity of retransmissions. This can effectively avoid wasting air interface resources.

A sending manner of indication information #A in this application is described below.

As an example rather than a limitation, a satellite #A may directly send the indication information #A to a terminal device #A.

Alternatively, the satellite #A may send the indication information #A to a satellite #B, and the satellite #B sends the indication information #A to the terminal device #A.

Alternatively, the satellite #A may send the indication information #A to another network device, for example, a terrestrial base station, and the terrestrial base station sends the indication information #A to the terminal device #A.

Alternatively, the satellite #A may send the indication information #A to another terminal device, for example, a terminal device #B, and the terminal device #B sends the indication information #A to the terminal device #A (for example, by using a D2D communication technology and the like).

It should be understood that the solution may be applied to an IoT NTN.

In a possible implementation, that the terminal device determines, based on a latest HARQ feedback result of uplink data and/or a latest decoding status of downlink data, a quantity of retransmissions actually required for the uplink data this time may include the following scenario: the latest uplink HARQ feedback result is an ACK and the quantity of retransmissions thereof is Z, and a quantity of retransmissions indicated for a current uplink data transmission is X, where Z<X. In this case, the required quantity of retransmissions this time may be Z.

Alternatively, in a recent downlink data decoding process, for example, data is retransmitted for A times, but the data can be correctly decoded based on B retransmissions, where B<X. In this case, the quantity of data retransmissions may be B.

Therefore, a quantity Y of retransmissions determined by the terminal device may be less than or equal to the quantity X of blind retransmissions indicated by the network device.

It should be understood that the second indication information may be sent together with a data packet, or may be separately sent from the data packet. This is not limited in this application.

In a possible implementation, the network side specifies that the quantity of uplink blind retransmissions of the terminal device is X, and the terminal device may obtain, based on the latest HARQ feedback result of the uplink data, the latest decoding status of the downlink data, or the like, and determine that the quantity of retransmissions actually required for the uplink data is Y (where $Y \leq X$). According to an agreement, the terminal device repeatedly sends data for X times. When the data is transmitted the first time, a prefix is added to the header of the data, and/or a suffix is added to the tail of the data, to indicate that the HARQ response is disabled.

The quantity M of bits of the prefix or the suffix may be determined with reference to the quantity X of retransmissions indicated by the network device, to ensure reliable decoding of the indication information. For example, M-a*X, and a=1 or 2.

In a possible implementation, the network side specifies that the quantity of uplink blind retransmissions of the terminal device is X. The terminal device may obtain, based on the latest HARQ feedback result of the uplink data, the latest decoding status of the downlink data, or the like, and determine that the quantity of retransmissions actually required for the uplink data is Y (where $Y \leq X$). According to an agreement between the terminal device and the network side, the terminal device repeatedly sends data for X times. In the $X^{th}$ data transmission, a prefix is added to a header of the data, and/or a suffix is added to a tail of the data, to indicate that the HARQ response is disabled. The quantity of bits of the prefix or the suffix may be determined with reference to the indicated quantity X of retransmissions, to ensure reliable decoding of the indication information. For example, M=a*X, and a=1 or 2.

In a possible implementation, the network side specifies that the quantity of uplink blind retransmissions of the terminal device is X. The terminal device may obtain, based on the latest HARQ feedback result of the uplink data, the latest decoding status of the downlink data, or the like, and determine that the quantity of retransmissions actually required for the uplink data is Y (where $Y \leq X$). According to a pre-established agreement, the terminal device repeatedly sends data for X times. In each data transmission, a prefix is added to a header of the data, or a suffix is added to a tail of the data, to indicate that the HARQ response is disabled. The quantity of bits of the prefix or the suffix may be determined with reference to the indicated quantity X of retransmissions, to ensure reliable decoding of the indication information. Because the indication information has been repeatedly transmitted, the quantity of bits of the prefix or the suffix does not need to refer to the quantity X of indicated retransmissions. For example, M-a, and a=1 or 2.

In the foregoing implementation, the indication information is added to the data packet, so that the network device can be notified of disabling of the response in the first data transmission, the last data transmission, or each data transmission. This can reduce delay, and the power consumption can be reduced by clearing the HARQ buffer in a timely manner.

In a possible implementation, the network side specifies that the quantity of uplink blind retransmissions of the terminal device is X, and the terminal device may obtain, based on the latest HARQ feedback result of the uplink data, the latest decoding status of the downlink data, or the like, and determine that the quantity of retransmissions actually required for the uplink data is Y (where $Y<X$). The terminal device repeatedly sends data for Y times. In the first data transmission, the terminal device adds a prefix to a header of the data, and/or adds a suffix to a tail of the data, to indicate that an actual quantity of retransmissions is Y.

Optionally, the prefix and/or the suffix may further include a HARQ response disabling indication.

A quantity M of bits of the prefix or the suffix may be determined with reference to the indicated quantity Y of retransmissions, to ensure reliable decoding of the indication information.

For example, $M=Y*((\log_2{}^{(Y)})+a)$, where a=0, 1, or 2, and ceil( ) is a rounding-up operation; and when a=0, disabling of the HARQ response is not indicated.

In a possible implementation, the network side specifies that the quantity of uplink blind retransmissions of the terminal device is X, and the terminal device may obtain, based on the latest HARQ feedback result of the uplink data, the latest decoding status of the downlink data, or the like, and determine that the quantity of retransmissions actually required for the uplink data is Y (where $Y<X$). The terminal device repeatedly sends data for Y times. In the Yth data transmission, the terminal device adds a prefix to a header of the data, and/or adds a suffix to a tail of the data, to indicate that an actual quantity of retransmissions is Y.

Optionally, the prefix and/or the suffix may further include a HARQ response disabling indication.

The quantity M of bits of the prefix or the suffix may be determined with reference to the indicated quantity Y of retransmissions, to ensure decoding reliability of the indication information.

For example, $M=Y*(\text{ceil}(\log_2{}^{(Y)})+a)$, where a=0, 1, or 2, and ceil( ) is a rounding-up operation; and when a=0, disabling of the HARQ response is not indicated.

In a possible implementation, the network side specifies that the quantity of uplink blind retransmissions of the terminal device is X, and the terminal device may obtain, based on the latest HARQ feedback result of the uplink data, the latest decoding status of the downlink data, or the like, and determine that the quantity of retransmissions actually required for the uplink data is Y (where $Y<X$). The terminal device repeatedly sends data for Y times. In the Yth data transmission, the terminal device adds a prefix to a header of the data, and/or adds a suffix to a tail of the data, to indicate to stop a retransmission. Alternatively, the terminal device may send retransmission stop indication information after the quantity of data transmissions reaches a specific threshold. It should be understood that the threshold may be preset, or may be manually defined.

Optionally, the prefix and/or the suffix may further include a HARQ response disabling indication.

A quantity M of bits of the prefix or the suffix may be determined with reference to the indicated quantity Y of retransmissions, to ensure decoding reliability of the indication information.

For example, $M=Y*(b+a)$, where a=0, 1, or 2, and b=1 or 2; and when a is 0, the HARQ response disabling indication is not performed.

In a possible implementation, the network side specifies that the quantity of uplink blind retransmissions of the terminal device is X, and the terminal device may obtain, based on the latest HARQ feedback result of the uplink data, the latest decoding status of the downlink data, or the like, and determine that the quantity of retransmissions actually required for the uplink data is Y (where $Y<X$). According to a pre-established agreement, the terminal device repeatedly sends data for Y times. In each data transmission, the terminal device adds a prefix to a header of the data, and/or adds a suffix to a tail of the data, to indicate that an actual quantity of retransmissions is Y.

Optionally, the prefix and/or the suffix may further include a HARQ response disabling indication.

The quantity M of bits of the prefix or the suffix may be determined with reference to the indicated quantity Y of retransmissions, to ensure decoding reliability of the indication information.

For example, M=ceil($\log_2^{(Y)}$)+a, where a=0, 1, or 2, and ceil( ) s a rounding-up operation; and when a=0, disabling of the HARQ response is not indicated.

In the foregoing implementation, a problem in the conventional technology that the network side needs to repeatedly perform transmission for X times based on an indication of the network side is resolved, the network side may be notified that the quantity of repetitions is reduced to Y, and the network side may schedule a vacant air interface resource in advance. The terminal device may stop sending after completing Y times of transmission, to perform sleep power saving. In addition, the HARQ buffer may be cleared in advance in combination with the HARQ response disabling indication, to further save power consumption.

Figure 4:
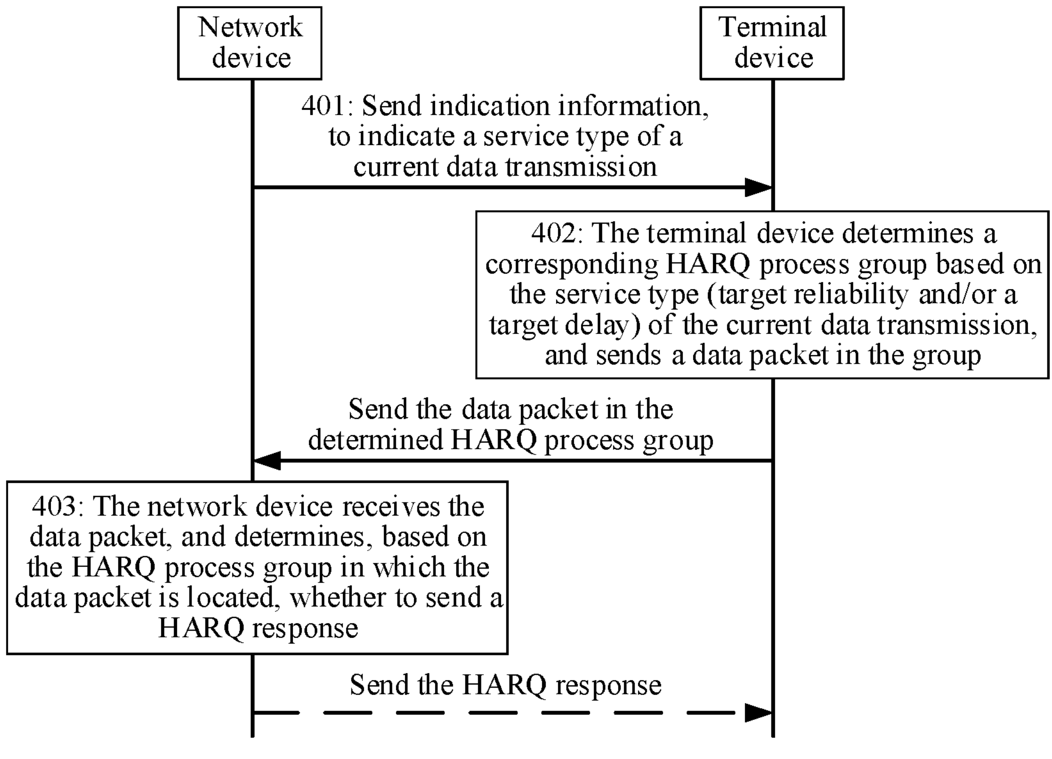
FIG. 4 is a schematic flowchart of a communication method to which this application is applicable.

Another embodiment of this application may be applied to an NR NTN, as shown in FIG. 4.

401: A network device indicates, to a terminal device, a service type of a current data transmission.

402: The terminal device determines a corresponding HARQ process group based on the service type (an information reliability requirement and delay sensitivity) of the current data transmission, and sends a data packet that is part of the HARQ process group.

It should be understood that, in a specific data transmission, the information reliability requirement may also be referred to as target reliability, and the delay sensitivity may also be referred to as a target delay.

403: The network device receives the data packet, and determines, based on the HARQ process group in which the data packet is located, whether to wait for retransmitted data and whether to perform a HARQ response.

In a possible implementation, for information with a high reliability requirement (for example, a MAC CE), the data packet used to transmit such information is arranged in a process or a process group in which the HARQ response is allowed; for information with a low reliability requirement and insensitive to a delay, the data packet used to transmit such information is selected to be placed in a HARQ process or process group in which the HARQ response is not allowed and no blind retransmission is performed; and for information with a high reliability requirement and no delay requirement, the HARQ response is allowed and no blind retransmission is performed. For information with a specific reliability requirement and a specific delay requirement, the data packet is selected to be placed in a HARQ process or process group in which no HARQ response is allowed and a blind retransmission is performed; and for information with a requirement for both reliability and a delay, the data packet is selected to be placed in a HARQ process or process group in which the HARQ response is allowed and a blind retransmission is performed.

Figure 5:
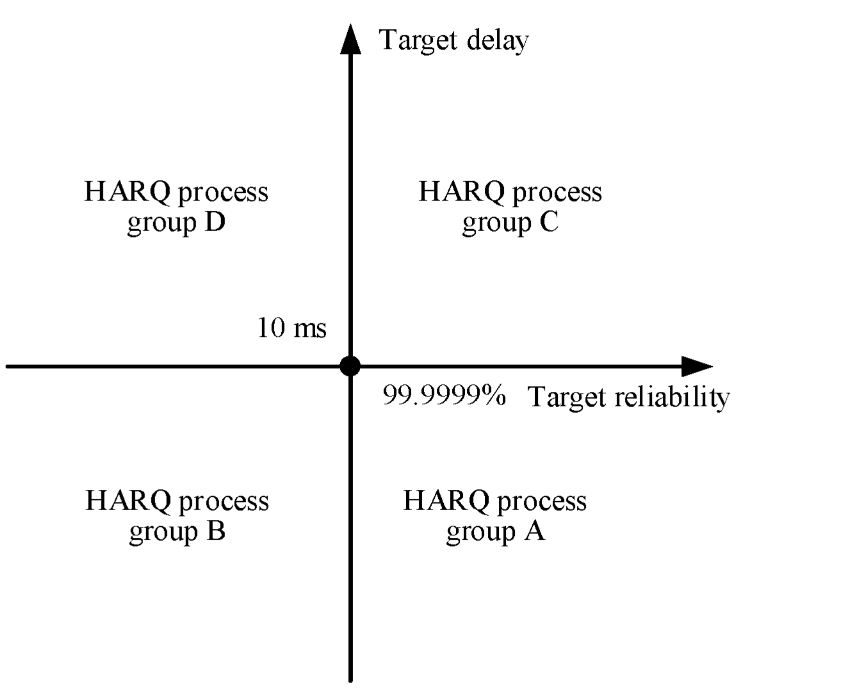
FIG. 5 is a schematic diagram of a HARQ process group applicable to this application.

For example, HARQ processes may be classified into four groups based on the reliability requirement and the delay sensitivity. The reliability requirement may be represented by data transmission reliability (which is a statistical quantity and represents a probability of accurately decoding a data packet), and the delay sensitivity may be represented based on a delay requirement of a service, as shown in FIG. 5.

A HARQ process group A corresponds to a service type that is delay-sensitive (a small target delay) and has a high reliability requirement (large target reliability). For example, if the delay requirement is less than 10 ms, and the reliability requirement is greater than 99.9999%, a transmission of the data packet of the service does not need HARQ response, but needs blind retransmission.

A HARQ process group B corresponds to a service type that is delay-sensitive but has a low reliability requirement. For example, if the delay requirement is less than 10 ms, and the reliability requirement is less than 99.9999%, a transmission of the data packet of the service does not need HARQ response or blind retransmission.

A HARQ process group C corresponds to a service type that is delay-insensitive but has a high reliability requirement. For example, if the delay requirement is greater than 10 ms, and the reliability requirement is greater than 99.9999%, a transmission of the data packet of the service needs HARQ response, and needs blind retransmission.

A HARQ process group D corresponds to a service type that is delay-insensitive and has a low reliability requirement. For example, if the delay requirement is greater than 10 ms, and the reliability requirement is less than 99.9999%, a transmission of the data packet of the service may not need HARQ response or blind retransmission.

In a possible implementation, the correspondence between the service type and the HARQ process group may be presented in a form of Table 1.

TABLE 1

Correspondence between the service type and the HARQ process group

| | Target reliability | |
|---|---|---|
| Target delay | High (greater than 99.9999%) | Low (less than 99.9999%) |
| Low (less than 10 ms) | HARQ process group A (no HARQ response is required, and a blind retransmission is required) | HARQ process group B (no HARQ response is required, and no blind retransmission is required) |
| High (greater than 10 ms) | HARQ process group C (a HARQ response is required, and a blind retransmission is required) | HARQ process group D (a HARQ response is required, and no blind retransmission is required) |

It should be understood that the foregoing numbers are merely used as an example rather than a limitation.

It should be further understood that Table 1 is merely used as an example rather than a limitation, and may be implemented partially or as a whole.

In a possible implementation, the network side and the terminal side store the correspondence between the service type and a HARQ process group.

Figure 6:
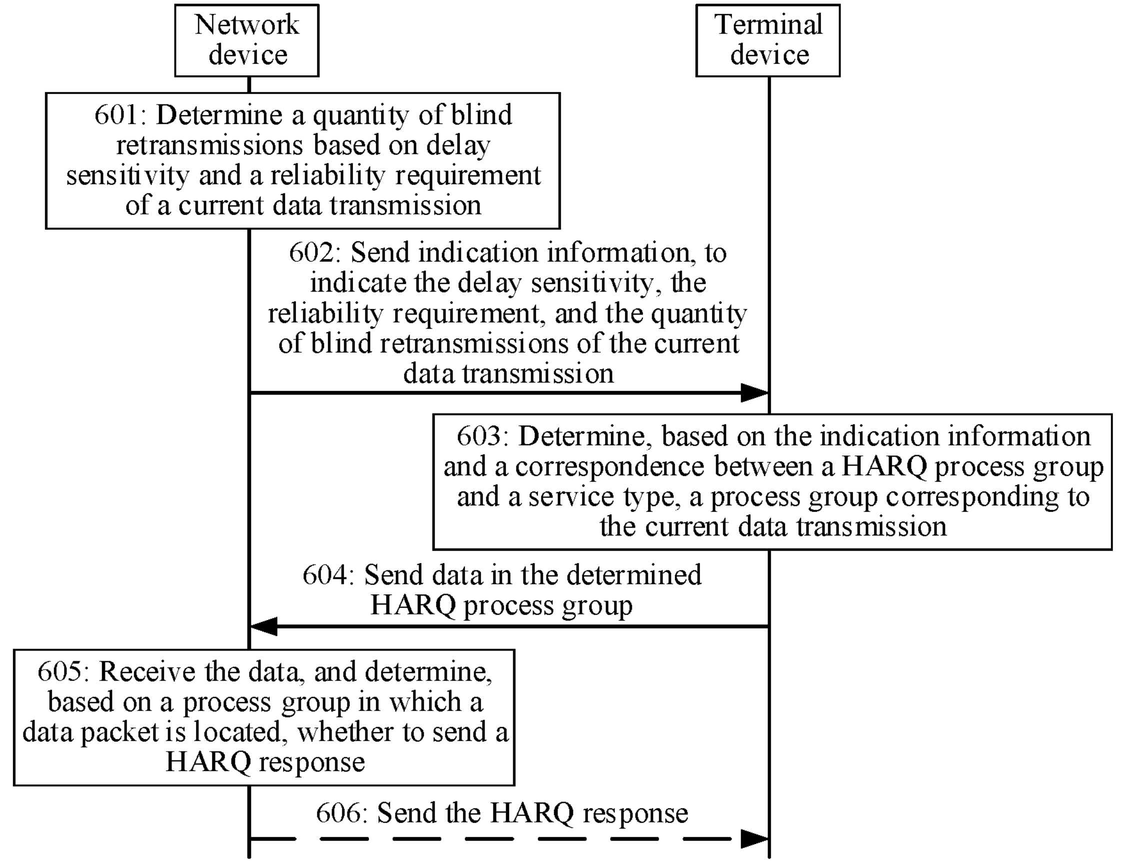
FIG. 6 is a schematic flowchart of a communication method to which this application is applicable.

In another possible implementation, as shown in FIG. 6:

601: A network device determines a quantity of blind retransmissions based on the delay sensitivity and the reliability requirement of a current data transmission.

602: The network device sends indication information, to indicate, to a terminal device, the delay sensitivity, the reliability requirement, and the quantity of blind retransmissions of the current data transmission.

603: The terminal device receives the indication information, and determines, based on the indication information and a correspondence between a service type and a HARQ process group, a process group corresponding to the current data transmission.

604: The terminal device sends the data through the process group.

605: The network device receives a data packet, determines, based on the process group in which the data packet is located, whether to feed back a HARQ response; and if determining to feed back the HARQ response, feeds back the HARQ response; or if determining not to feed back the HARQ response, does not feed back the HARQ.

Figures 7, 8:
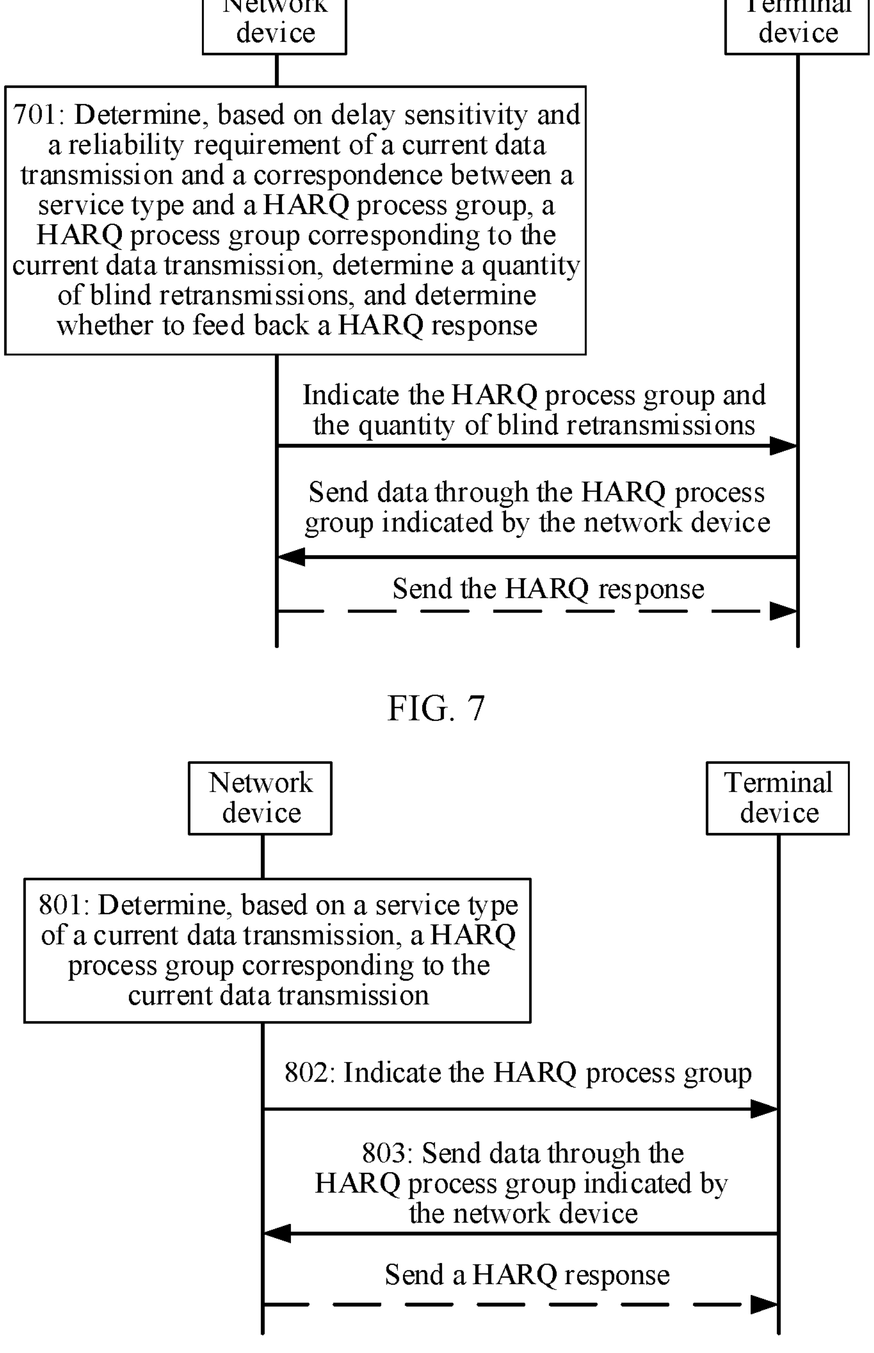
FIG. 7 is a schematic flowchart of a communication method to which this application is applicable.
FIG. 8 is a schematic flowchart of a communication method to which this application is applicable.

In another possible implementation, as shown in FIG. 7:

701: A network device determines, based on the delay sensitivity and the reliability requirement of a current data transmission and a correspondence between the service type and the HARQ process group corresponding to the current data transmission, a quantity of blind retransmissions and whether to feed back a HARQ response, and indicates the HARQ process group, the quantity of blind retransmissions, and whether to feed back the HARQ to a terminal device.

702: The terminal device sends the data through the process group.

703: If it is determined that the HARQ response needs to be fed back, the network device feeds back the HARQ response; or if it is determined that the HARQ response does not need to be fed back, the network device does not feed back the HARQ response.

In another possible implementation, there may be no need to use the delay sensitivity and the reliability requirement of the current data transmission as a reference, and grouping is performed only based on whether the response is fed back and the quantity of blind retransmissions.

In a possible implementation, the service type is bound to the quantity of blind retransmissions and a HARQ response requirement, and the correspondence between the service type and the HARQ process group may be presented in a form of Table 2.

TABLE 2

Correspondence between the service type and the HARQ process group

| | Target reliability | |
|---|---|---|
| Target delay | High (greater than 99.9999%) | Low (less than 99.9999%) |
| High (less than 10 ms) | HARQ process group A (no HARQ response is required, and a quantity of blind retransmissions is J) | HARQ process group B (no HARQ response is required, and no blind retransmission is required) |
| Low (greater than 10 ms) | HARQ process group C (a HARQ response is required, and a quantity of blind retransmissions is K) | HARQ process group D (a HARQ response is required, and no blind retransmission is required) |

It should be understood that the foregoing numbers are merely used as an example rather than a limitation.

It should be further understood that Table 2 is merely used as an example rather than a limitation, and may be implemented partially or as a whole.

In a possible implementation, a network side and a terminal side store the correspondence between the service type and the HARQ process group, and the correspondence may be preset or may be configured.

Details may be shown in FIG. 8.

801: A network device determines a process group based on a service type and a correspondence.

802: The network device indicates the process group to a terminal device.

803: The terminal device performs a data transmission through the process group.

In the foregoing embodiment, a quantity of blind retransmissions is bound to the service type and the HARQ process group. On one hand, the quantity of retransmissions bound to the service type and the group better meets a service requirement. On the other hand, the quantity of retransmissions is specified based on the service type, so that signaling overheads can be reduced. In addition, some HARQ processes do not need to wait for a HARQ response, and a HARQ buffer can be cleared in a timely manner, and long waiting for the response can be avoided, thereby improving network throughput.

Figure 9:
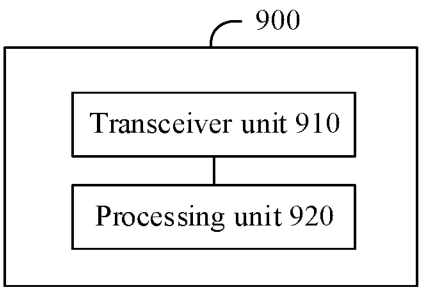
FIG. 9 is a schematic block diagram of a communication apparatus according to an embodiment of this application.

FIG. 9 is a schematic block diagram of a communication apparatus 900 according to an embodiment of this application. The apparatus 900 includes a transceiver unit 910 and a processing unit 920. The transceiver unit 910 may communicate with the outside, and the processing unit 920 is configured to process data. The transceiver unit 910 may also be referred to as a communication interface or a communication unit. It is noted that term "unit" in the present disclosure may be used to refer a hardware component, a software component, or a hardware component configured with software, as understood by a person skilled in the art.

Optionally, the apparatus 900 may further include a storage unit. The storage unit may be configured to store instructions and/or data. The processing unit 920 may read the instructions and/or the data in the storage unit.

The apparatus 900 may be configured to perform an action performed by the satellite in the foregoing method embodiments. In this case, the apparatus 900 may be a satellite or a component that can be configured in the satellite. The transceiver unit 910 is configured to perform receiving and trasnmitting related operations on a satellite side in the foregoing method embodiments. The processing unit 920 is configured to perform a processing related operation on the satellite side in the foregoing method embodiments.

Alternatively, the apparatus 900 may be configured to perform an action performed by the terminal device in the foregoing method embodiments. In this case, the apparatus 900 may be a terminal device or a component that can be configured in the terminal device. The transceiver unit 910 is configured to perform receiving and sending related operations on a terminal device side in the foregoing method embodiments. The processing unit 920 is configured to perform a processing related operation on the terminal device side in the foregoing method embodiments.

Figure 10:
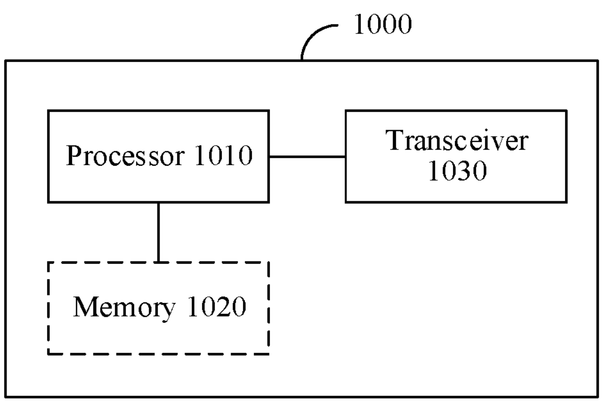
FIG. 10 is another schematic block diagram of a communication apparatus according to an embodiment of this application.

As shown in FIG. 10, an embodiment of this application further provides a communication apparatus 1000. The communication apparatus 1000 includes a processor 1010. The processor 1010 is coupled to a memory 1020. The memory 1020 is configured to store a computer program or instructions and/or data. The processor 1010 is configured to execute the computer program or the instructions and/or the data stored in the memory 1020, so that the method in the foregoing methods embodiment is performed.

Optionally, the communication apparatus 1000 includes one or more processors 1010.

Optionally, as shown in FIG. 10, the communication apparatus 1000 may further include a memory 1020.

Optionally, the communication apparatus 1000 may include one or more memories 1020.

Optionally, the memory 1020 may be integrated with the processor 1010, or may be separately disposed.

Optionally, as shown in FIG. 10, the communication apparatus 1000 may further include a transceiver 1030, and the transceiver 1030 is configured to receive and/or send a signal. For example, the processor 1010 is configured to control the transceiver 1030 to receive and/or send the signal.

In a solution, the communication apparatus 1000 is configured to implement an operation performed by the satellite in the foregoing method embodiments.

For example, the processor 1010 is configured to implement a processing related operation performed by the satellite in the foregoing method embodiments. The transceiver 1030 is configured to implement receiving and sending related operations performed by the satellite in the foregoing method embodiments.

In another solution, the communication apparatus 1000 is configured to implement operations performed by the terminal device in the foregoing method embodiments.

For example, the processor 1010 is configured to perform a processing related operation performed by the terminal device in the foregoing method embodiments. The transceiver 1030 is configured to perform receiving and sending related operations performed by the terminal device in the foregoing method embodiments.

Figure 11:
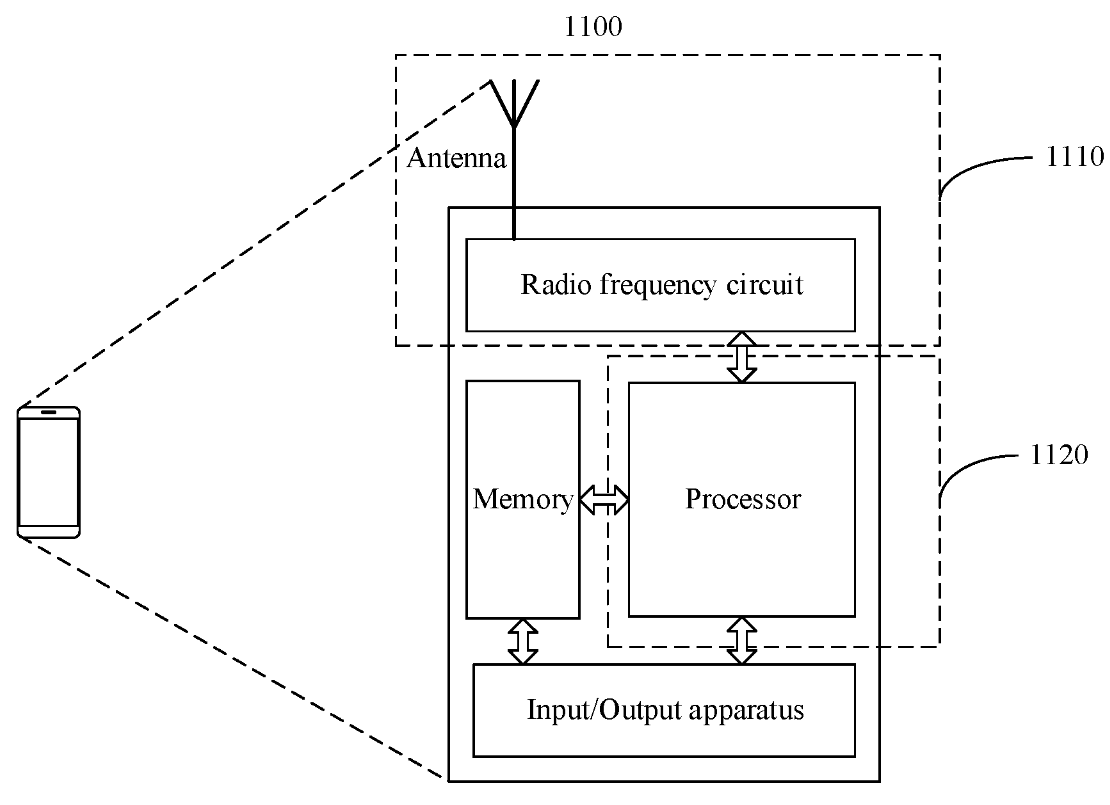
FIG. 11 is a schematic block diagram of a terminal device according to an embodiment of this application.

An embodiment of this application further provides a communication apparatus 1100. The communication apparatus 1100 may be a terminal device or a chip. The communication apparatus 1100 may be configured to perform operations performed by the terminal device in the foregoing method embodiments. When the communication apparatus 1100 is a terminal device, FIG. 11 is a simplified schematic diagram of a structure of the terminal device. For ease of understanding and ease of illustration, in FIG. 11, an example in which the terminal device is a mobile phone is used. As shown in FIG. 11, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is configured to store the software program and data. The radio frequency circuit is mainly configured to: perform conversion between a baseband signal and a radio frequency signal, and process the radio frequency signal. The antenna is configured to receive and send a radio frequency signal in a form of an electromagnetic wave. The input/output apparatus, such as a touchscreen, a display, or a keyboard, is mainly configured to: receive data input by a user and output data to the user. It should be noted that some types of terminal devices may have no input/output apparatus.

When data needs to be sent, the processor performs baseband processing on the to-be-sent data, and then outputs a baseband signal to the radio frequency circuit. After performing radio frequency processing on the baseband signal, the radio frequency circuit sends a radio frequency signal in a form of an electromagnetic wave to the outside through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 11 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and a radio frequency circuit that have a transceiver function may be considered as a transceiver unit of the terminal device, and a processor that has a processing function may be considered as a processing unit of the terminal device.

As shown in FIG. 11, the terminal device includes a transceiver unit 1110 and a processing unit 1120. The transceiver unit 1110 may also be referred to as a transceiver, a transceiver machine, a transceiver apparatus, or the like. The processing unit 1120 may also be referred to as a processor, a processing board, a processing module, a processing apparatus, or the like.

Optionally, a component that is in the transceiver unit 1110 and that is configured to implement a receiving function may be considered as a receiving unit, and a component that is in the transceiver unit 1110 and that is configured to implement a sending function may be considered as a sending unit. That is, the transceiver unit 1110 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

For example, in an implementation, the transceiver unit 1110 is configured to perform a receiving operation performed by the terminal device. The processing unit 1120 is configured to perform a processing action performed on a terminal device side.

It should be understood that FIG. 11 is merely an example but not a limitation. The terminal device including the transceiver unit and the processing unit may not configured with the structure shown in FIG. 11.

When the communication apparatus 1100 is a chip, the chip includes a transceiver unit and a processing unit. The transceiver unit may be an input/output circuit or a communication interface. The processing unit may be a processor, a microprocessor, or an integrated circuit that is integrated on the chip. The input circuit may be an input pin. The output circuit may be an output pin. The processing circuit may be a transistor, a gate circuit, a trigger, any logic circuit, or the like. An input signal received by the input circuit may be received and input by, for example, but not limited to, a receiver. A signal output by the output circuit may be output to, for example, but not limited to, a transmitter and transmitted by the transmitter. In addition, the input circuit and the output circuit may be different circuits, or may be a same circuit. In this case, the circuit is used as the input circuit and the output circuit at different moments.

An embodiment of this application further provides a communication apparatus 1200. The communication apparatus 1200 may be a satellite or a chip. The communication apparatus 1200 may be configured to perform operations performed by the satellite in the foregoing method embodiments.

Figure 12:
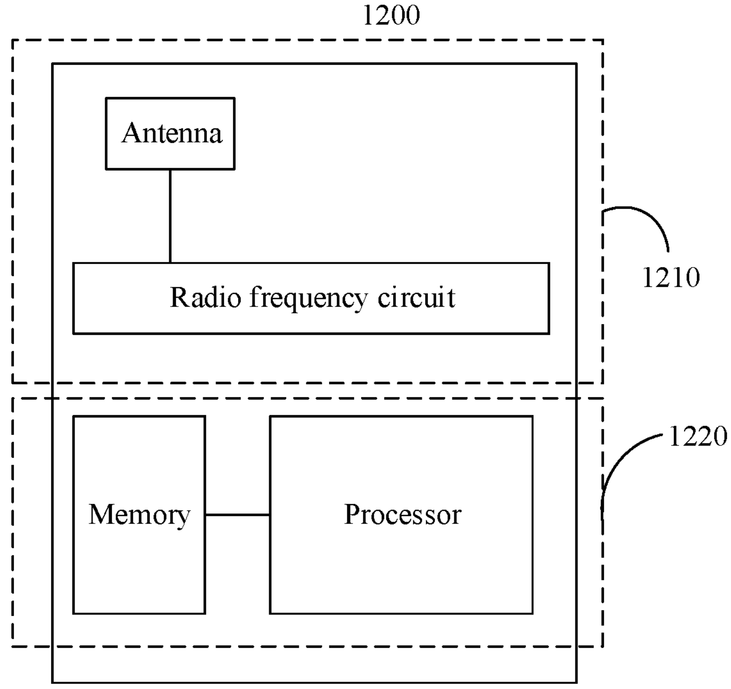
FIG. 12 is a schematic block diagram of a satellite according to an embodiment of this application.

When the communication apparatus 1200 is a satellite, for example, a satellite base station, FIG. 12 is a simplified schematic diagram of a structure of a base station. The base station includes a component 1210 and a component 1220. The component 1210 is mainly configured to: receive and send a radio frequency signal, and perform conversion between the radio frequency signal and a baseband signal.

The component 1220 is configured to: perform baseband processing, control the base station, and the like. The component 1210 may be usually referred to as a transceiver unit, a transceiver machine, a transceiver circuit, a transceiver, or the like. The component 1220 is usually a control center of the base station, and may usually be referred to as a processing unit, and is configured to control the base station to perform a processing operation on a network device side in the foregoing method embodiments.

The transceiver unit in the component 1210 may also be referred to as a transceiver machine, a transceiver, or the like. The transceiver unit includes an antenna and a radio frequency circuit, where the radio frequency circuit is mainly configured to perform radio frequency processing. Optionally, a component that is in the component 1210 and that is configured to implement a receiving function may be considered as a receiving unit, and a component that is configured to implement a sending function may be considered as a sending unit. That is, the component 1210 includes the receiving unit and the sending unit. The receiving unit may also be referred to as a receiver machine, a receiver, a receiver circuit, or the like. The sending unit may be referred to as a transmitter machine, a transmitter, a transmitter circuit, or the like.

The component 1220 may include one or more boards, and each board may include one or more processors and one or more memories. The processor is configured to read and execute a program in the memory, to implement a baseband processing function and control the base station. If there are a plurality of boards, the boards may be interconnected with each other, to enhance a processing capability. In an optional implementation, a plurality of boards may share one or more processors, a plurality of boards may share one or more memories, or a plurality of boards may simultaneously share one or more processors.

For example, in an implementation, the transceiver unit in the component 1210 is configured to perform receiving and sending related steps performed by the satellite in the embodiments. The component 1220 is configured to perform a processing related step performed by the satellite.

It should be understood that FIG. 12 is merely an example but not a limitation. The network device including the transceiver unit and the processing unit may not depend on the structure shown in FIG. 12.

When the communication apparatus 1200 is the chip, the chip includes a transceiver unit and a processing unit. The transceiver unit may be an input/output circuit or a communication interface. The processing unit is a processor, a microprocessor, or an integrated circuit integrated on the chip. The input circuit may be an input pin. The output circuit may be an output pin. The processing circuit may be a transistor, a gate circuit, a trigger, any logic circuit, or the like. An input signal received by the input circuit may be received and input by, for example, but not limited to, a receiver. A signal output by the output circuit may be output to, for example, but not limited to, a transmitter and transmitted by the transmitter. In addition, the input circuit and the output circuit may be different circuits, or may be a same circuit. In this case, the circuit is used as the input circuit and the output circuit at different moments.

An embodiment of this application further provides a computer-readable storage medium. The computer-readable storage medium stores computer instructions used to implement the method performed by the terminal device or the method performed by the satellite in the foregoing method embodiments.

For example, when the computer program is executed by a computer, the computer may be enabled to implement the method performed by the terminal device or the method performed by the satellite in the foregoing method embodiments.

An embodiment of this application further provides a computer program product including instructions. When the instructions are executed by a computer, the computer is enabled to implement the method performed by the terminal device or the method performed by the network device in the foregoing method embodiments.

An embodiment of this application further provides a communication system. The communication system includes the satellite and the terminal device in the foregoing embodiments.

In an example, the communication system includes the satellite and the terminal device in the foregoing embodiments.

For explanations and beneficial effects of related content of any of the wireless communication apparatuses provided above, refer to the corresponding method embodiments provided above. Details are not described herein again.

In embodiments of this application, the terminal device or the network device may include a hardware layer, an operating system layer running above the hardware layer, and an application layer running above the operating system layer. The hardware layer may include hardware such as a central processing unit (CPU), a memory management unit (MMU), and a memory (also referred to as a primary memory). An operating system at the operating system layer may be any one or more computer operating systems that implement service processing through a process, for example, a Linux operating system, a Unix operating system, an Android operating system, an iOS operating system, or a Windows operating system. The application layer may include applications such as a browser, an address book, word processing software, and instant messaging software.

A specific structure of an execution body of the method provided in embodiments of this application is not limited in embodiments of this application, provided that a program that records code for the method provided in embodiments of this application can be run to perform communication according to the method provided in embodiments of this application. For example, the method provided in embodiments of this application may be performed by a terminal device, a satellite, or a functional module that is in the terminal device or the satellite and that can invoke a program and execute the program.

Aspects or features in embodiments of this application may be implemented as a method, an apparatus, or a product that uses standard programming and/or engineering technologies. The term "product" used in this specification may cover a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive).

Various storage media described in this specification may indicate one or more devices and/or other machine-readable media that are configured to store information. The term "machine-readable media" may include but is not limited to a radio channel and various other media that can store, include, and/or carry instructions and/or data.

It should be understood that the processor in embodiments of this application may be a central processing unit (CPU), another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be understood that the memory mentioned in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM). For example, the RAM may be used as an external cache. By way of an example but not limitations, the RAM may include the following plurality of forms: a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate or a transistor logic device, or a discrete hardware component, the memory (storage module) may be integrated into the processor.

It should further be noted that the memory described in this specification aims to include but is not limited to these memories and any memory of another proper type.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of embodiments of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in embodiments of this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one place, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of embodiments of this application essentially, or the part contributing to the conventional technology, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in embodiments of this application shall fall within the protection scope of this application. Therefore, the protection scope of this application shall be subject to the protection scope of the claims.

What is claimed is:

1. A hybrid automatic repeat request (HARQ) feedback method, comprising:

receiving, by a first communication apparatus, first indication information, wherein the first indication information indicates a first quantity of retransmission of first data;

obtaining, by the first communication apparatus, a second quantity of retransmissions based on a HARQ feedback result and/or a decoding result of second data, wherein the second data is data sent or received by the first communication apparatus before the first communication apparatus retransmits the first data; and sending, by the first communication apparatus, the first data using a target quantity of retransmissions, wherein the target quantity of retransmissions is a smaller one of the first quantity of retransmissions and the second quantity of retransmissions;

wherein the obtaining, by the first communication apparatus, the second quantity of retransmissions based on the HARQ feedback result of the second data comprises:

determining, by the first communication apparatus, the second quantity of retransmissions based on a quantity of times that the second data is already repeatedly uploaded when an acknowledgment (ACK) is fed back.

2. The method according to claim 1, wherein the obtaining, by the first communication apparatus, the second quantity of retransmissions based on the decoding result of the second data comprises:

determining, by the first communication apparatus, the second quantity of retransmissions based on a quantity of combined data packets used for decoding of the second data when the ACK is obtained through decoding of the second data.

3. The method according to claim 1, wherein the method further comprises:

sending, by the first communication apparatus, second indication information, wherein the second indication information indicates that a HARQ response is disabled for the first data.

4. The method according to claim 3, wherein the sending, by the first communication apparatus, the second indication information comprises:

sending, by the first communication apparatus, the second indication information when transmitting the first data for the first time;

sending, by the first communication apparatus, the second indication information when transmitting the first data for the last time; or sending, by the first communication apparatus, the second indication information when transmitting the first data each time.

5. The method according to claim 3, wherein the second indication information is located in the first data.

6. The method according to claim 5, wherein when the first communication apparatus sends the second indication information when sending the first data for the first time, or when the first communication apparatus sends the second indication information when sending the first data for the last time, a quantity of bits occupied by the second indication information is determined based on the second quantity of retransmissions.

7. The method according to claim 4, wherein the method further comprises:

when the target quantity of retransmissions is the second quantity of retransmissions, sending, by the first communication apparatus, information about the second quantity of retransmissions.

8. The method according to claim 4, wherein the method further comprises:

sending, by the first communication apparatus, third indication information when a quantity of retransmissions of the first data is greater than a preset threshold, wherein the third indication information indicates to stop a retransmission of the first data.

9. The method according to claim 1, wherein the method further comprises:

clearing, by the first communication apparatus, a HARQ buffer after completing sending of the first data for the last time.

10. A hybrid automatic repeat request (HARQ) feedback method, comprising:

sending, by a second communication apparatus, first indication information, wherein the first indication information indicates a first quantity of retransmission of first data; and receiving, by the second communication apparatus, the first data by using a target quantity of retransmissions, wherein the target quantity of retransmissions is a smaller one of the first quantity of retransmissions and a second quantity of retransmissions, the second quantity of retransmissions is obtained by a terminal device based on a HARQ feedback result and/or a decoding result of second data, and the second data is data sent or received by the terminal device before the terminal device retransmits the first data;

wherein the second quantity of retransmissions is determined based on a quantity of times that the second data is already repeatedly uploaded when an acknowledgment (ACK) is fed back.

11. The method according to claim 10, wherein the second quantity of retransmissions is determined based on a quantity of combined data packets supporting decoding of the second data when the ACK is obtained through decoding of the second data.

12. The method according to claim 10, wherein the method further comprises:

receiving, by the second communication apparatus, second indication information, wherein the second indication information indicates that a HARQ response is disabled for the first data.

13. The method according to claim 12, wherein the receiving, by the second communication apparatus, second indication information comprises:

receiving, by the second communication apparatus, the second indication information when receiving the first data for the first time;

receiving, by the second communication apparatus, the second indication information when receiving the first data for the last time; or receiving, by the second communication apparatus, the second indication information when receiving the first data each time.

14. The method according to claim 12, wherein the second indication information is located in the first data.

15. The method according to claim 14, wherein when the second communication apparatus receives the second indication information when receiving the first data for the first time, or the second communication apparatus receives the second indication information when receiving the first data for the last time, a quantity of bits occupied by the second indication information is determined based on the second quantity of retransmissions.

16. The method according to claim 10, wherein the method further comprises:

when the target quantity of retransmissions is the second quantity of retransmissions, receiving, by the second communication apparatus, information about the second quantity of retransmissions.

17. A hybrid automatic repeat request (HARQ) feedback method, comprising:

receiving, by a first communication apparatus, fourth indication information, wherein the fourth indication information indicates a service type of third data;

determining, by the first communication apparatus based on a first mapping relationship, a first HARQ process group corresponding to the third data, wherein the first mapping relationship comprises a mapping relationship between the service type of the third data and the first HARQ process group; and sending, by the first communication apparatus, the third data through a first HARQ process, wherein the first HARQ process is a process in the first HARQ process group.

18. The method according to claim 17, wherein the first mapping relationship comprises:

a first service type corresponding to a second HARQ process group, wherein the first service type comprises a service type whose target delay is less than a first threshold and target reliability is greater than a second threshold, and a blind retransmission is allowed and a HARQ response is disabled in each HARQ process comprised in the second HARQ process group;

a second service type corresponding to a third HARQ process group, wherein the second service type comprises a service type whose target delay is less than the first threshold and target reliability is less than the second threshold, and a blind retransmission and a HARQ response are disabled in each HARQ process comprised in the third HARQ process group;

a third service type corresponding to a fourth HARQ process group, wherein the third service type comprises a service type whose target delay is greater than the first threshold and target reliability is greater than the second threshold, and a HARQ response and a blind retransmission are allowed in each HARQ process comprised in the fourth HARQ process group; and a fourth service type corresponding to a fifth HARQ process group, wherein the fourth service type comprises a service type whose target delay is greater than the first threshold and target reliability is less than the second threshold, and a HARQ response is allowed and a blind retransmission is disabled in each HARQ process comprised in the fifth HARQ process group.

* * * * *